J. DICK.
FODDER CUTTER FEED MECHANISM.
APPLICATION FILED JULY 8, 1916.
1,296,485.
Patented Mar. 4, 1919.
6 SHEETS—SHEET 4.
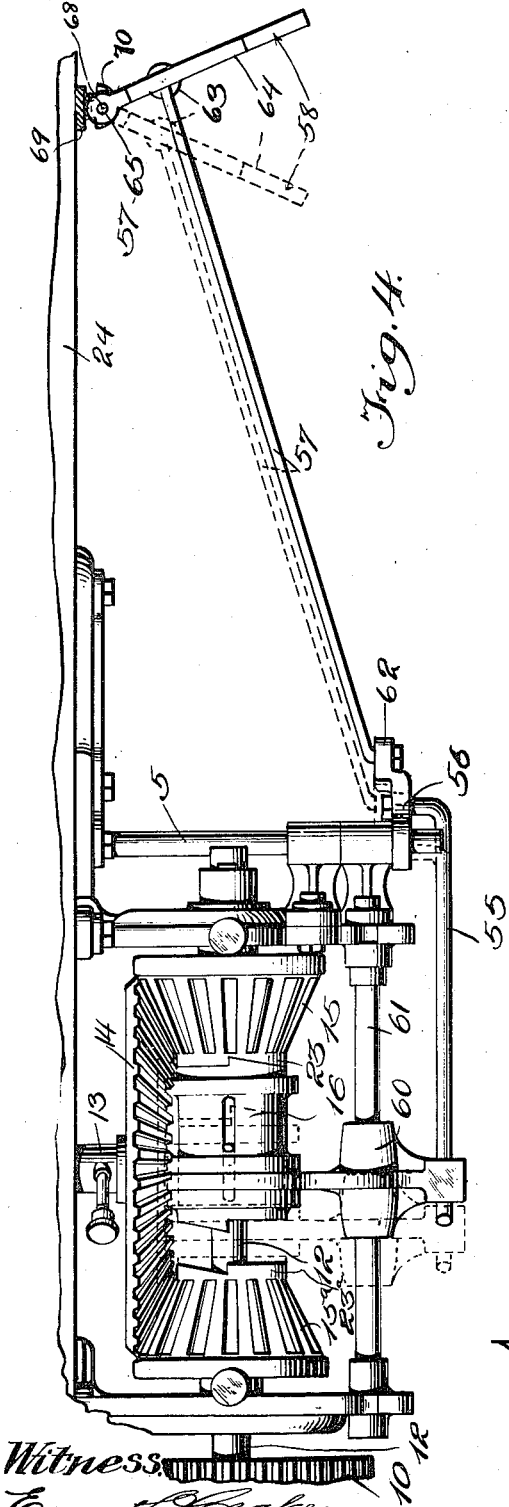
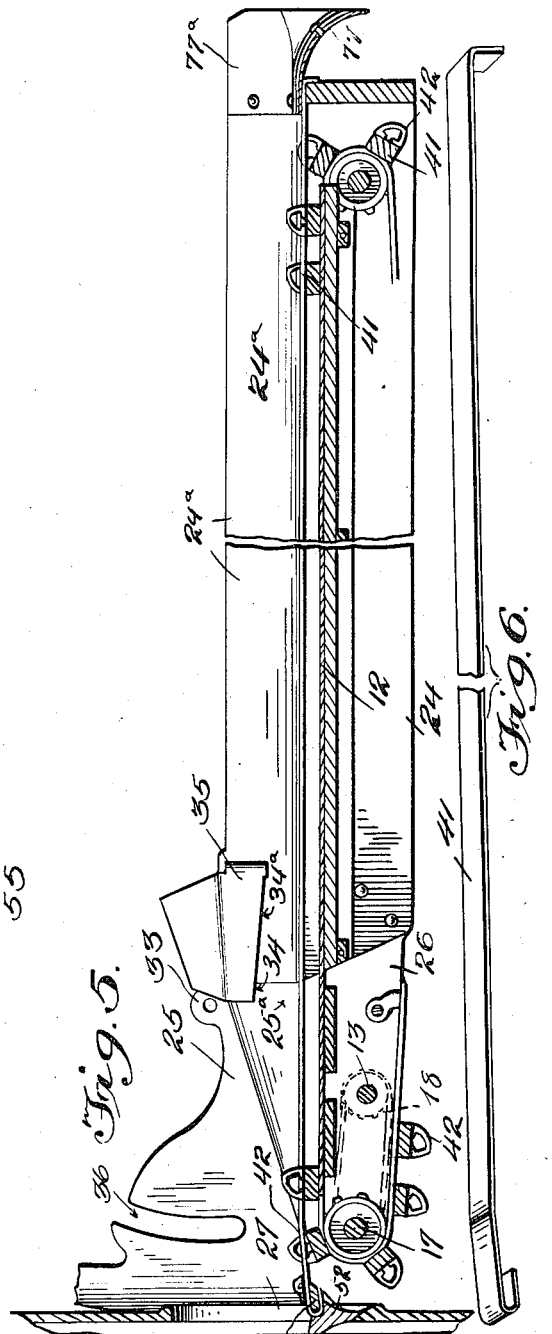
Witness
Ernest C. Croker
Inventor
Joseph Dick.
By Harry Frease
Attorney J. DICK.
FODDER CUTTER FEED MECHANISM.
APPLICATION FILED JULY 8, 1916.
1,296,485.
Patented Mar. 4, 1919.
6 SHEETS—SHEET 5.
Fig. 7.
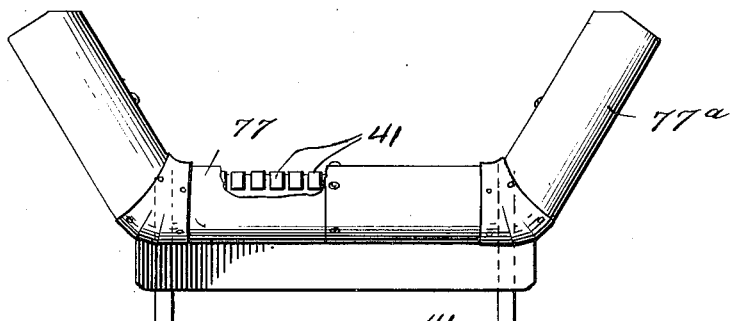
Fig. 8.
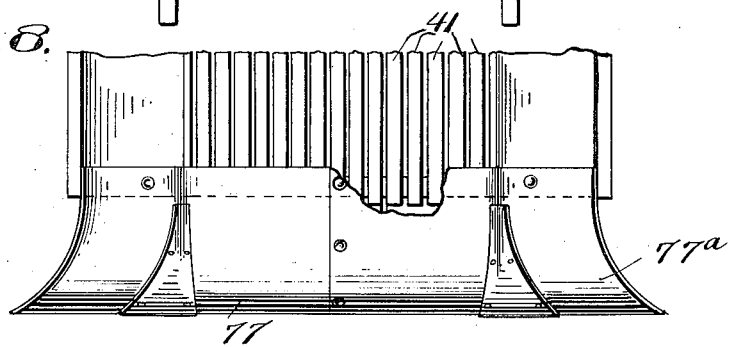
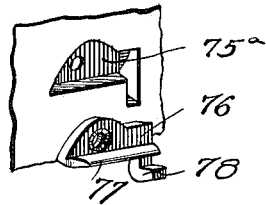
Fig. 9.
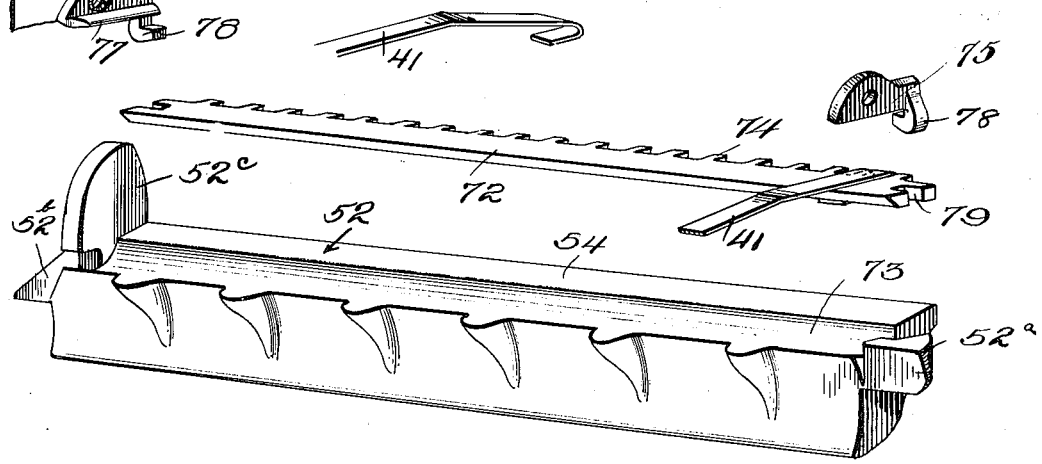
Witness:
Ernest A. Crocker
Inventor
Joseph Dick
By Harry Frease
Attorney

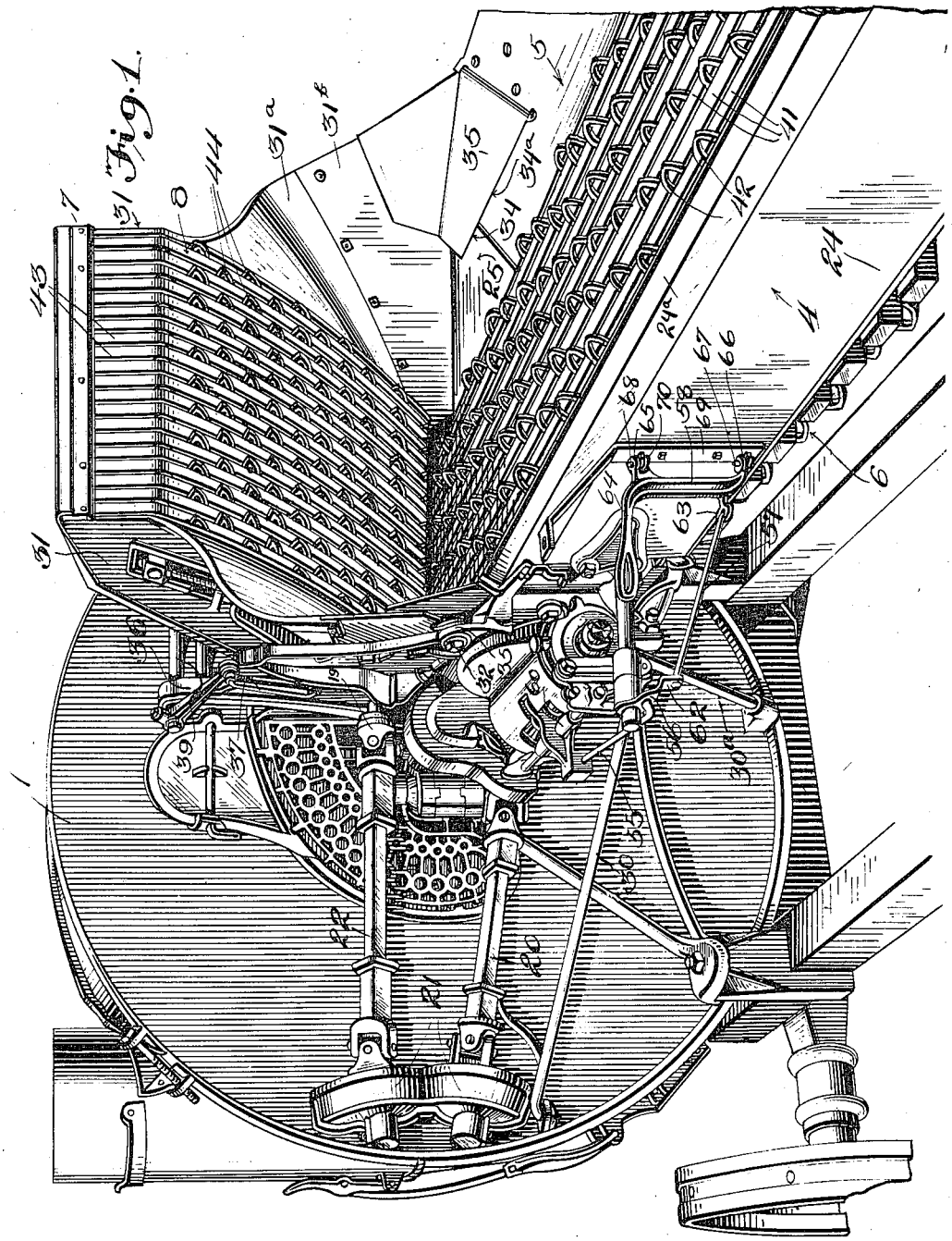

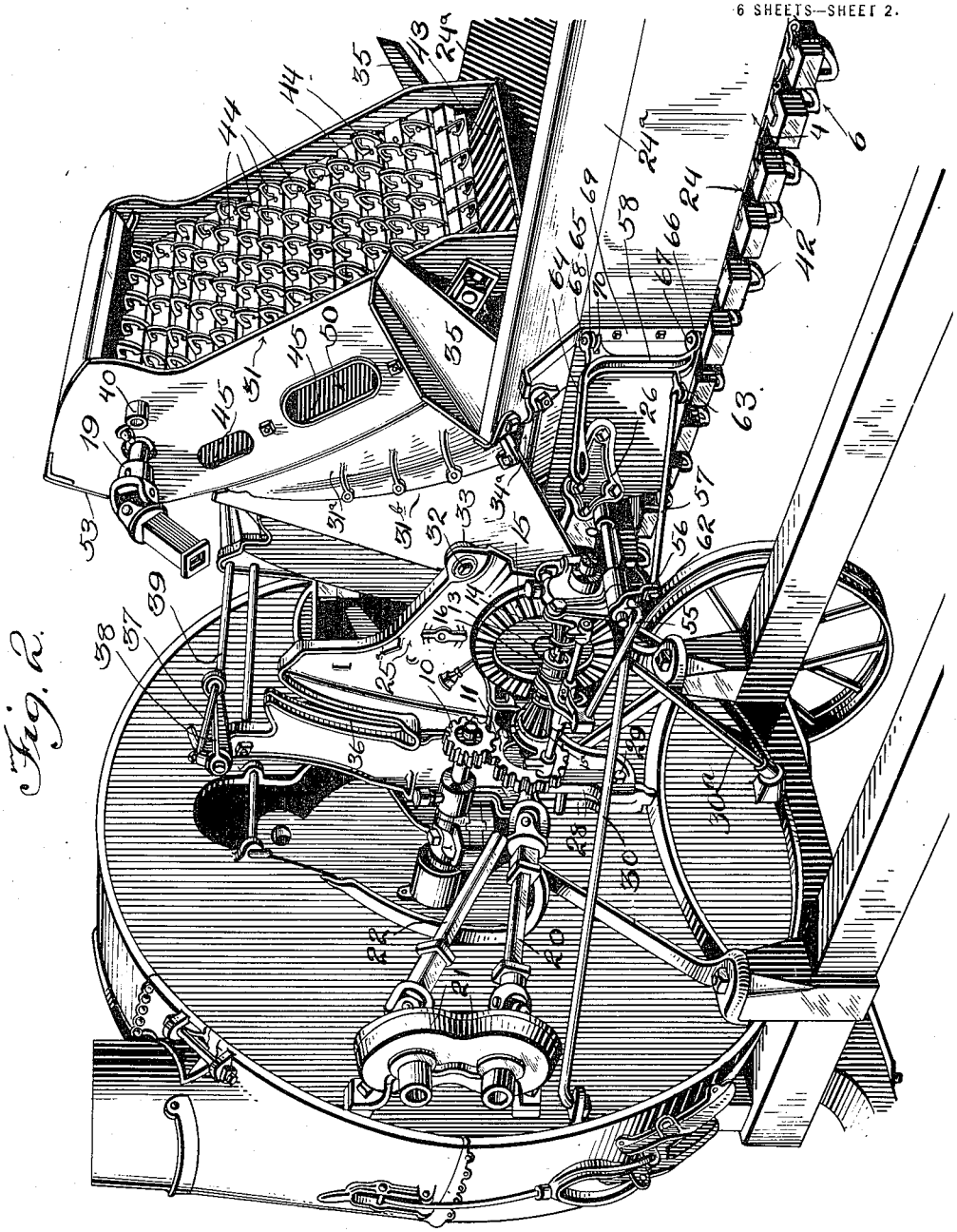

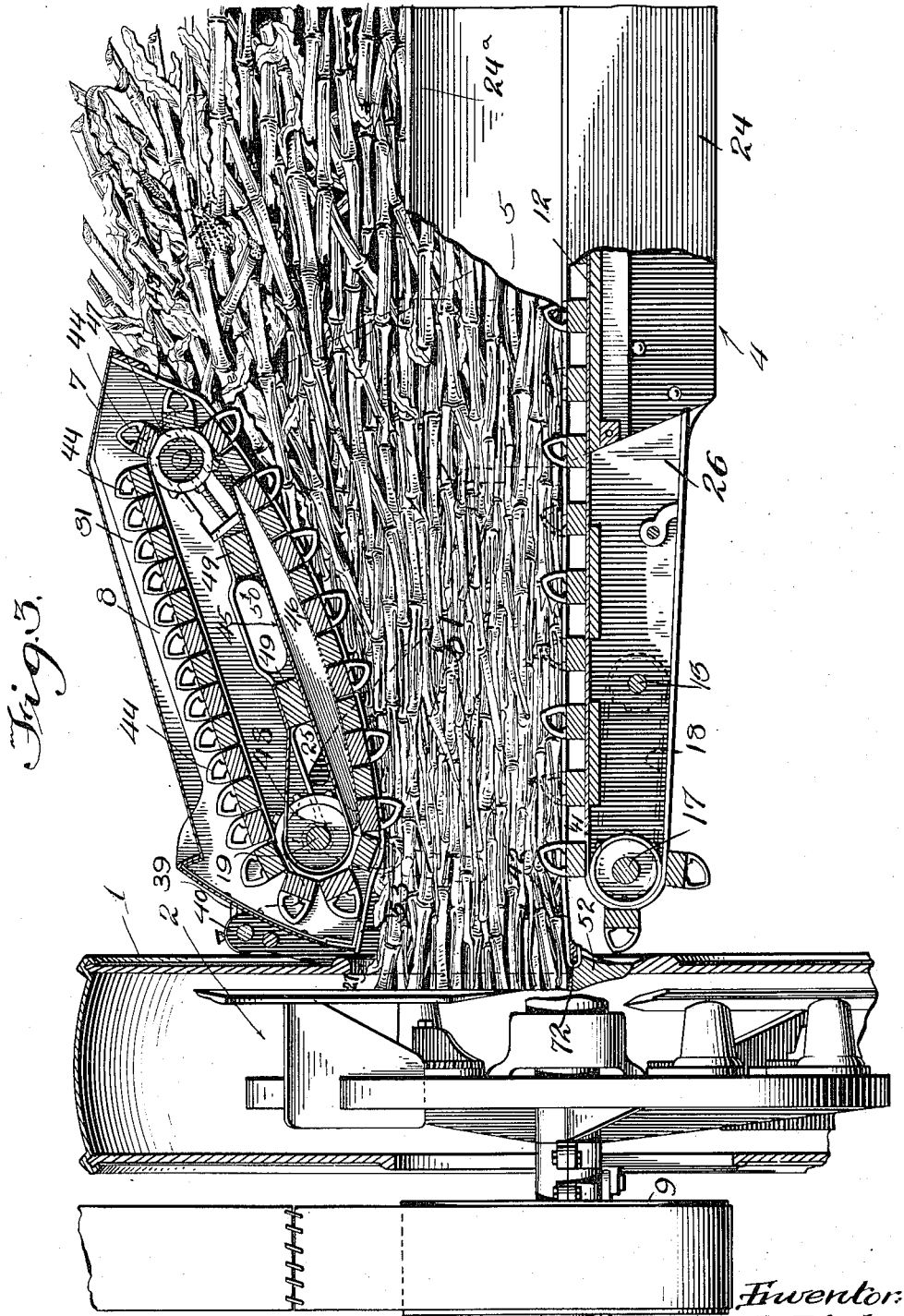

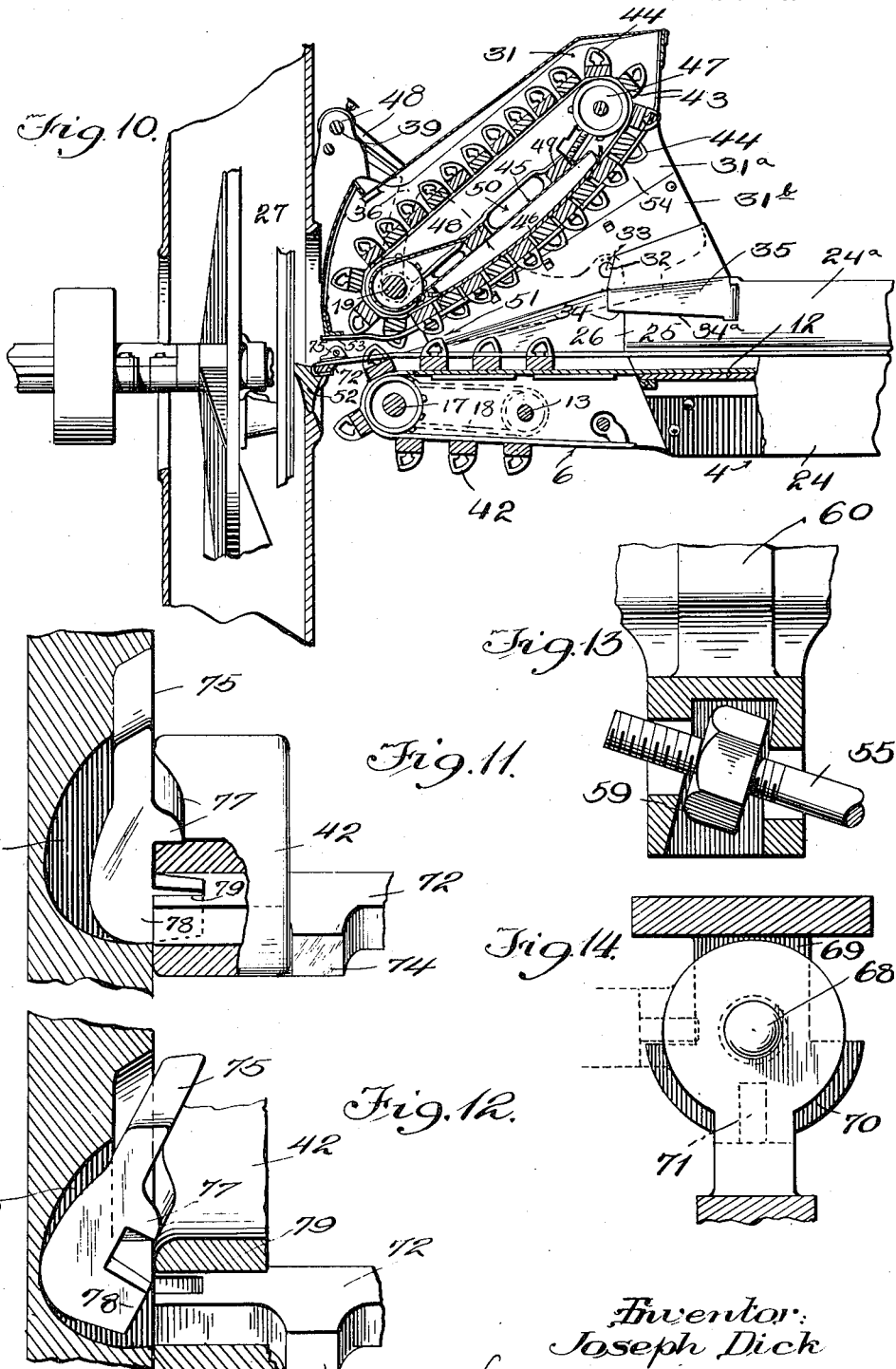

UNITED STATES PATENT OFFICE.

JOSEPH DICK, OF CANTON, OHIO, ASSIGNOR TO THE JOSEPH DICK MANUFACTURING COMPANY, OF CANTON, OHIO, A CORPORATION OF OHIO.

FODDER-CUTTER FEED MECHANISM.

1,296,485.   Specification of Letters Patent.   Patented Mar. 4, 1919.

Application filed July 8, 1916. Serial No. 108,191.

*To all whom it may concern:*

Be it known that I, JOSEPH DICK, a citizen of the United States, residing at Canton, in the county of Stark and State of Ohio, have invented certain new and useful Improvements in Fodder-Cutter Feed Mechanism, of which the following is a specification.

The invention relates to mechanism for feeding corn stalk, alfalfa and other long, limber and tangled material into fodder cutting machines of the general type shown in my prior Patents Nos. 1,065,596; 1,070,019, and 1,072,924; and the objects of the improvements are to prevent a clogging or choking of the feed mechanism by the bulk of the fodder during the feeding operation, to shield certain parts of the mechanism from an accumulation of dust and dirt, to provide protective means for stopping or reversing the feed mechanism to safeguard the operator, and to simplify the construction of sundry parts of the mechanism to facilitate the assembling and inspection and a repair of the same.

These objects of the invention and other ancillary advantages, are attained by the mechanism, construction and arrangement illustrated in the accompanying drawings, forming part hereof, in which—

Figure 1 is a fragmentary perspective view of the improved feed mechanism applied to a fodder cutter, showing the parts in operative position;

Fig. 2, a similar view, showing the feed hood swung back upon the feed trough, and with certain parts of the operating mechanism exposed to view;

Fig. 3, a fragmentary longitudinal section of the machine illustrating the action of the feed mechanism;

Fig. 4, a plan view of the reversing gearing for the feed mechanism;

Fig. 5, a longitudinal section of the feed trough;

Fig. 6, a detached perspective view of one conveyer bar;

Fig. 7, a forward end view of the feed trough;

Fig. 8, a fragmentary plan view of the same;

Fig. 9, a disassociated perspective view of the cutter bar and means for supporting the rear ends of the bottom bars;

Fig. 10, a longitudinal section of the feed hood and hopper, showing the hood in its initial operative position;

Fig. 11, a fragmentary section showing the locking bracket for the rear end of the conveyer bars;

Fig. 12, a similar view showing the method of applying the same;

Fig. 13, a fragmentary section showing the loose joint of the controller connecting bar; and Fig. 14, a fragmentary plan view of the controlling lever pivotal support.

Similar numerals refer to similar parts throughout the drawings.

The fodder cutter includes a case 1 having the usual cutting and blowing mechanism 2 therein, rigidly mounted on the main shaft 3, which is axially journaled in the case: a feed trough 4 and feed hopper 5 having an endless conveyer 6 therein; and an oscillating feed hood 7 mounted on the feed hopper having an inverted endless conveyer 8 therein.

The power pulley 9 is secured on the rear end of the main shaft 3, and the gear pinion 10 is secured on the forward end of the main shaft; which pinion meshes with a gear wheel 11 secured on a countershaft 12 which is journaled in bearings on one side of the feed trough 4, and extends longitudinally thereof. The countershaft 12 thus rotates continuously when the cutting and blowing mechanism is in operation.

A transverse countershaft 13 is journaled in the bottom of the feed hopper, and has secured on one end a beveled gear wheel 14 adapted to mesh alternately on opposite sides with either one of a pair of spaced pinions 15 and 15ª journaled on the countershaft 12 on each side of a double clutch 16 which is feathered or splined on the countershaft.

Power is transmitted from the countershaft 13 to the rear shaft 17 of the feed conveyer 6 by means of a chain gear 18, and in turn the shaft 17 transmits power to the lower rear shaft 19 of the feed hood conveyer by means of an extensible shaft 20, a bevel gearing 21, and an extensible shaft 22.

The pinions 15 and 15ª are provided with opposing clutch faces 23 and 23ª adapted to be engaged by the clutch sleeve 16, so that when it is desired to operate the feed conveyers, the clutch member is shifted from its neutral position opposite the center of the bevel gear wheel 14, into engagement with either one or the other of the pinions, depending upon the direction it is desired to operate the conveyers.

The gearings are so arranged that the conveyers will operate rearward for feeding the machine when the clutch sleeve 16 is engaged with the clutch pinion 15, and will operate in the reverse direction when the clutch sleeve is engaged with the rearward pinion 15ª.

The rear shaft 17 of the feed conveyer 6 and the rear shaft 19 of the hood conveyer 8, are journaled in the sides of the hopper and hood respectively at the rear ends thereof and adjacent to the forward side of the case 1, so that fodder is fed directly by the conveyers into the fodder cutter.

The upright side walls 24 of the feed trough 4 are provided with the outwardly flared upper portions 24ª, and the rear ends of these walls are secured to the forward ends of the upright side walls 25 of the feed hopper by the connecting brackets 26. The side walls 25 of the feed hopper are provided with the flared portions 25ª corresponding to the flared portions 24ª of the feed trough. The feed conveyer 6 is mounted between the side walls 24 and 25 of the feed trough and hopper; and the feed hopper 5 is secured to the forward side of the case in front of the feed opening 27 therein by means of the flanges 28, the bolts 29, and a plurality of connecting braces 30 and 30ª.

The upright side walls 31 of the feed hood 7, between which the inverted conveyer 8 is mounted, are provided with the flared lower portions 31ª and the depending walls 31ᵇ, which normally telescope within the side walls 25 of the feed hopper, to the forward upper ends of which they are pivoted, as by means of bolts 32 in the bearings 33; so that the hood can oscillate freely upward and downward during the operation of the machine, and may also be swung upward and forward on the feed hopper away from the cutting and blowing mechanism, when it is desired to inspect the feed opening 27 in the forward side of the fodder cutter case, as shown in Fig. 2.

To permit the forward swinging of the feed hood, adjacent portions of the flared side walls 24ª and 25ª are cut away at 34 and 34ª and the notches formed thereby are normally closed by the bridge plates 35 which are hinged or detachably secured to the flared walls 24ª of the feed trough, and may either be removed, or swung forward as shown in Fig. 2, to permit the forward edges of the side walls 31 of the hood to enter in the notches 34 when the hood is swung forward.

A slot 36, curved on the pivot bolts 32 of the feed hood as a center, is provided in each side wall 25 of the feed hopper, in which slots the protruding ends of the rear shaft 19 of the feed hood are adapted to move during the oscillation or swinging of the feed hood; and during the oscillating movements of the feed hood, the rear end thereof is held against twisting strains by the pendent links 37 pivoted on the free ends of the parallel arms 38, secured on the rock shaft 39 journaled in the upper rear ends of the side walls 25 of the hopper; which links are detachably pivoted in the bearing bosses 40 on the side walls of the feed hood, which are located to operate in the curved slots 36 in the side walls 25 of the feed hopper. These paralleling means serve to stay the feed hood against twisting strains during the oscillation thereof in the operation of the feed mechanism, and for swinging the hood forward as shown in Fig. 2, it is only necessary to detach the links 37 from the bearing bosses 40.

The bottom of the feed trough is formed by the laterally spaced longitudinal bars 41, between which the protruding teeth 42 of the trough conveyer 6 operate longitudinally of the feed trough; and the inverted face of the feed hopper is formed by the laterally spaced longitudinal bars 43, between which the protruding teeth 44 of the hood conveyer 8 operate longitudinally of the feed hood. The hood conveyer coöperates with the trough and hopper conveyer for feeding fodder into the feed opening of the fodder cutter, in the manner set forth in said prior patents.

In the construction of the conveyer teeth 42 and 44, the rear edges thereof are curved forward on such a radius that when they are drawn inward by the chain gearings at the rear ends of the respective conveyers, they will present a retreating edge at all times during their rearward movement, until they have finally disappeared between the conveyer bars, thereby effecting a withdrawal of the teeth from engagement with the fodder without catching or carrying any of the fodder through the intervals between the longitudinal conveyer bars.

The dust and chaff which drops through the intervals between the bottom bars of the feed trough and hopper, is carried forward by the endless conveyer and drops to the floor or ground over the rear end thereof. To prevent an accumulation of such dust and chaff which may find its way upward through the longitudinal bars of the inverted conveyer, the transverse sheet shield 45 is provided in the feed hood above the bearing plate 46 which guides the lower section of the hood conveyer 8; which shield sheet extends from a point near the forward gear wheels 47, thence rearward below and looping upward and forward around the rearward gear wheels 48, and thence forward to a point intermediate the gear wheels, as shown in Fig. 3.

The shield sheet may be secured on cross bars 49 provided in the feed hood for that purpose, the rearmost one of which bars forms a closure between the looped end of the sheet and the adjacent portion thereof; and suitable longitudinal slots are provided in the rear curved end of the sheet to accommodate the operation of the sprockets on the rear gear wheel 48. The dust and chaff which finds its way into the feed hood is carried rearward and upward around the shield sheet, and thence forward to the middle of the hood, whence it finds its way outward through the openings 50 provided in the side walls 31 of the hood for that purpose.

The longitudinal bars 43 of the feed hood are so curved intermediate their ends as to present a longitudinal convex face to the fodder, and incline somewhat abruptly rearward and downward, when the machine is not in operation, to form a throat 51 between the rear ends of the respective conveyers a substantial distance in front of the cutter bar 52 and the feed opening 27 of the fodder cutter; this throat being of sufficient height to permit the free passing of the conveyer teeth between the bottom of the feed trough and the inverted face of the feed hood, when the hood is in its initial operating position, as shown in Fig. 10.

The feed throat 51 is preferably located between the gear wheels on the rear shafts 17 and 19 of the coöperating conveyers; in rear of which throat the longitudinal bars 41 forming the bottom of the feed trough are preferably inclined slightly downward to the cutter bar 52, and the longitudinal bars 43 forming the inverted face of the feed hood, are preferably curved first slightly upward and then extended rearward to the rear end of the hood 53 at a point preferably a substantial distance above the projection of the continuation of the main curve of the inverted face of the hood; thereby materially enlarging the depth of the opening between the rear ends of the coöperating conveyers at the cutter bar and feed opening of the fodder cutter, as compared with the depth of the feed throat, so that in the operation of the machine at its maximum feeding capacity, as shown in Fig. 3, there is permitted a slight expansion in the bulk of the fodder after it has passed rearward through the more restricted feed throat.

The longitudinal curve of the convex face 43 of the feed hood is preferably such that when the hood is swung upward for a full capacity operation, as shown in Fig. 3, the face of the hood is located in a substantially horizontal tangent plane at or near the feed throat of the mechanism, in front of the feed opening of the fodder cutter; and it has been found by thus convexly curving the face of the feed hood in front of the feed throat entirely prevents any clogging or choking of the feed mechanism, however much fodder may be placed upon the feed trough.

That is to say, the feed mechanism thus described is able to take care of all of the fodder which can be taken in under the forward end 54 of the feed hood, and the weight of the hood serves to compress and pass the same through the feed throat and thence rearward into the feed opening of the fodder cutter, without oscillating the rear end of the feed hood upward above the top of the feed opening, and without any choking or checking of the operation of the feed mechanism; it being understood that the fodder cutting mechanism and blowing mechanism is able to cut and carry away all the fodder which can be fed through the feed opening of the fodder cutter.

The improved operation of the feed mechanism thus described renders unnecessary the use of automatic means for stopping and reversing the feed mechanism to prevent or relieve a choking of the fodder therein; but to prevent an injury to the operator who necessarily stands at the side of the feed trough in front of the feed hood, it is preferred to provide protecting means for stopping or reversing the feed mechanism which are necessarily operated by the operator in case he accidentally falls upon the feed trough or is drawn under the feed hood.

Such means may comprise the connecting bar 55, the rock lever 56, the connecting link 57 and the horizontally movable controlling lever 58. The rear end of the bar 55 is connected by the universal joint 59 with the laterally extending arm 60 on the double clutch 16, which arm preferably rides on and is guided by the slide bar 61 mounted alongside the reversing gearing; and the forward end of the bar 55 is pivoted to the rock lever 56, which is mounted on the transverse rock shaft 62 journaled at the forward ends of the reversing gearing. The rear end of the connecting link 57 is pivoted to the free end of the rock lever 56, and the forward end of the link is pivoted to the short arm 63 of the controlling lever 58.

The controlling lever 58 is preferably made with an upright body or stem portion having the outwardly extending short arm 63 at its lower end and long arm 64 at its upper end; and being provided with the inwardly extending bearing arms 65 above and 66 below on its opposite inner side. The lower bearing arm 66 engages upon the upright pivot post 67 secured to the side of the feed hopper and the upper bearing arm 65 engages on the upright pivot post 68 also secured to the side of the feed hopper. The pivot post 68 may be mounted upon a bearing bracket 69 having a semi-circular disk head 70 on its outer end, under which the lug 71 protruding from the stem of the operating lever below the upper bearing arm 68 is adapted to operate to hold the lever in engagement with the pivot post; it being understood that by rotating the lever arms in either direction to a position parallel with the feed trough, the lug 71 is disengaged from the disk head 70 and the lever may be removed from the pivot post.

The controlling lever 58 is located on the side of the feed trough a short distance in front of the feed hopper and hood, and the proper position for the operator is alongside the feed trough in front of the controlling lever. The long arm of the controlling lever extends directly outward from the side of the feed trough when the double clutch 16 is in its intermediate or neutral position, as shown in Figs. 1 and 2. It is evident that by rotating the long arm of the controlling lever forward, which is done manually by the operator, the feed mechanism will be operated for feeding the machine; and that by rotating the lever rearward, the operation of the feed mechanism will be stopped when the lever stands directly outward, and will be reversed when the lever is moved rearward far enough to shift the double clutch into engagement with the reversing pinion 15ª.

By such location and arrangement of the controlling lever, it is evident that the same can be manually manipulated by the operator for starting, stopping and reversing the machine, without changing his proper position alongside the feed trough; and more important, it is obvious that perchance the operator is thrown or falls upon the feed trough, by being struck with a bundle of fodder or because of other accident, his body is carried rearward by the conveyer or upon the fodder, and his pendent hip or leg will impinge the long arm of the controlling lever and operate the same rearward for first stopping and finally reversing the operation of the feed mechanism, before the operator is carried into the feed hopper underneath the feed hood. The described location of the controlling lever also permits it to be operated for stopping or reversing the feed mechanism by pressure of the operator's side or leg, without the use of his hands. And finally this location of the controlling lever necessarily positions the operator at a substantial distance in front of the feed hood, beyond the danger of being accidentally caught by the inverted conveyer thereof.

For convenience of construction in assembling and separating the parts, the longitudinal bottom bars 42 of the feed trough are extended to form the bottom of the feed hopper, and their forward ends are bent downward and forward around the transverse alining bar 72; and these parts bear upon the rear side of the cutter bar 52, which is preferably provided with the rabbet 73 for that purpose. The cutter bar is detachably secured to the fodder cutter case as by means of the lug 52ª on one end and the lug 52ᵇ and the ear 52ᶜ on the other end, and the alining bar 72 is provided with the fingers 74 between which the bent rear ends of the bottom bars 42 are properly positioned and spaced apart.

A locking bracket 75 is provided for each end of the alining bar 72, which brackets are adapted to enter and be secured in recesses 76 provided therefor in the side walls of the feed hopper, and are provided with the lateral flanges 77 resting upon the ends of the alining bar 72, for stopping the same from upward movement, and are also provided with the depending L-lugs 78, which enter and engage in the notches 79 provided in the ends of the alining bar for preventing a lateral movement thereof. The L-lugs of the locking brackets are inserted around the bottom bars of the feed hopper into the notch on the alining bar by a lateral turning of the bracket, as illustrated in Fig. 12, after which the brackets are bolted in position in the sockets 76 in the sides of the feed hopper.

By this construction and arrangement it is evident that in case of breakage or other occasion, the cutter bar 54 can be removed from under the rear ends of the feed hopper bottom bars 42 without disturbing or removing the same; and also that in case of need, one or more of the bottom bars can be removed and replaced without disturbing the cutter bar. At the same time, the rear ends of the bottom bars are securely held in proper position upon the cutter bar.

The forward ends of the feed hopper bottom bars rest upon and may be secured to the forward end wall thereof, and may also be bent downward along the forward side thereof, as shown in Fig. 2. For the purpose of preventing the fodder from catching and clogging against the forward end of the feed trough, the curved flared sheet metal flanges 77 and 77ª are secured to the forward ends of the bottom and sides of the feed trough, which flared flanges serve to guide the fodder into and upon the forward end of the trough, and thereby facilitates the operation of the feed mechanism.

Reference is hereby made to my copending application filed July 8, 1916, Serial No. 108,192 for fodder cutter feed conveyer, containing claims for certain features illustrated and described but not claimed herein.

I claim:

1. Feed mechanism for fodder cutters and the like, comprising a feed trough having a feed hopper at its rear end, with an endless conveyer therein, an oscillating feed hood on the hopper having an inverted endless conveyer coöperating with the trough and hopper conveyer, the face of the hood conveyer being convexly curved intermediate its ends and converged toward the hopper conveyer to form a throat adjacent to the rear end thereof.

2. Feed mechanism for fodder cutters and the like, comprising a feed trough having a feed hopper at its rear end with an endless conveyer therein, an oscillating feed hood on the hopper having an inverted endless conveyer coöperating with the trough and hopper conveyer, the face of the hood conveyer being convexly curved intermediate its ends and converged toward the hopper conveyer to form a throat adjacent to the rear end thereof, the curved face being substantially tangent to a horizontal plane at the throat when the hood is oscillated upward for its maximum feeding capacity.

3. Feed mechanism for fodder cutters and the like, including an inverted conveyer having walls on its sides, gear wheels in its forward and rearward ends and an endless chain operating around the wheels, a transverse shielding sheet between the walls extending rearward from the forward wheels under the rearward wheels, then looped around and over the rearward wheels and extending forward to a point intermediate the gear wheels, there being slots in the looped portion of the sheet for the sprockets of the rearward wheels, and a closure between the looped end of the sheet and the adjacent portion thereof, and there being openings in the side walls of the conveyer in front of said closure.

4. Feed mechanism for fodder cutters and the like, including a feed trough having a feed mechanism at its rear end, gearing for operating the feed mechanism with controlling means for starting, stopping and reversing the same, said controlling means having a laterally extending horizontally movable actuating arm on the side of the trough at a point in advance of the feed mechanism.

5. Feed mechanism for fodder cutters and the like, including a feed trough, a feed hood at the rear end of the trough with feed mechanism on their opposing faces, gearing for operating the feed mechanism with controlling means for starting, stopping and reversing the same, including a laterally extending lever fulcrumed on upright pivots at the side of the feed trough in front of the feed hood.

6. Feed mechanism for fodder cutters having a transverse cutter bar therein including a feed trough with laterally spaced longitudinal bottom bars therein having their forward ends bent downward and rearward, a transverse alining bar within the bent ends of the bottom bars having fingers on its side extending between the bottom bars, the bent ends of the bottom bars bearing on the cutter bars, and means for locking the alining bar against upward and lateral movement.

7. Feed mechanism for fodder cutters having a transverse cutter bar therein including a feed trough with laterally spaced longitudinal bottom bars therein having their forward ends bent downward and rearward, a transverse alining bar within the bent ends of the bottom bars, with notches in its ends having fingers on its side extending between the bottom bars, there being a rabbet in the side of the cutter bar for receiving and bearing the bent ends of the bottom bars, and locking dogs having flanges extending over the ends of the alining bar and L-lugs extending around the bottom bars on each side into the end notches of the alining bar.

8. Feed mechanism for fodder cutters and the like, including a feed trough having a feed mechanism at its rear end, gearing for operating the feed mechanism with controlling means for reversing the same, said controlling means having a laterally extending horizontally movable actuating arm on the side of the trough at a point in advance of the feed mechanism.

JOSEPH DICK.